INVENTOR.
HENRY H. EMKER

Nov. 6, 1956
H. H. EMKER
2,769,928
ELECTRICAL CALIBRATING AND TEST APPARATUS
Filed July 14, 1955
6 Sheets-Sheet 2
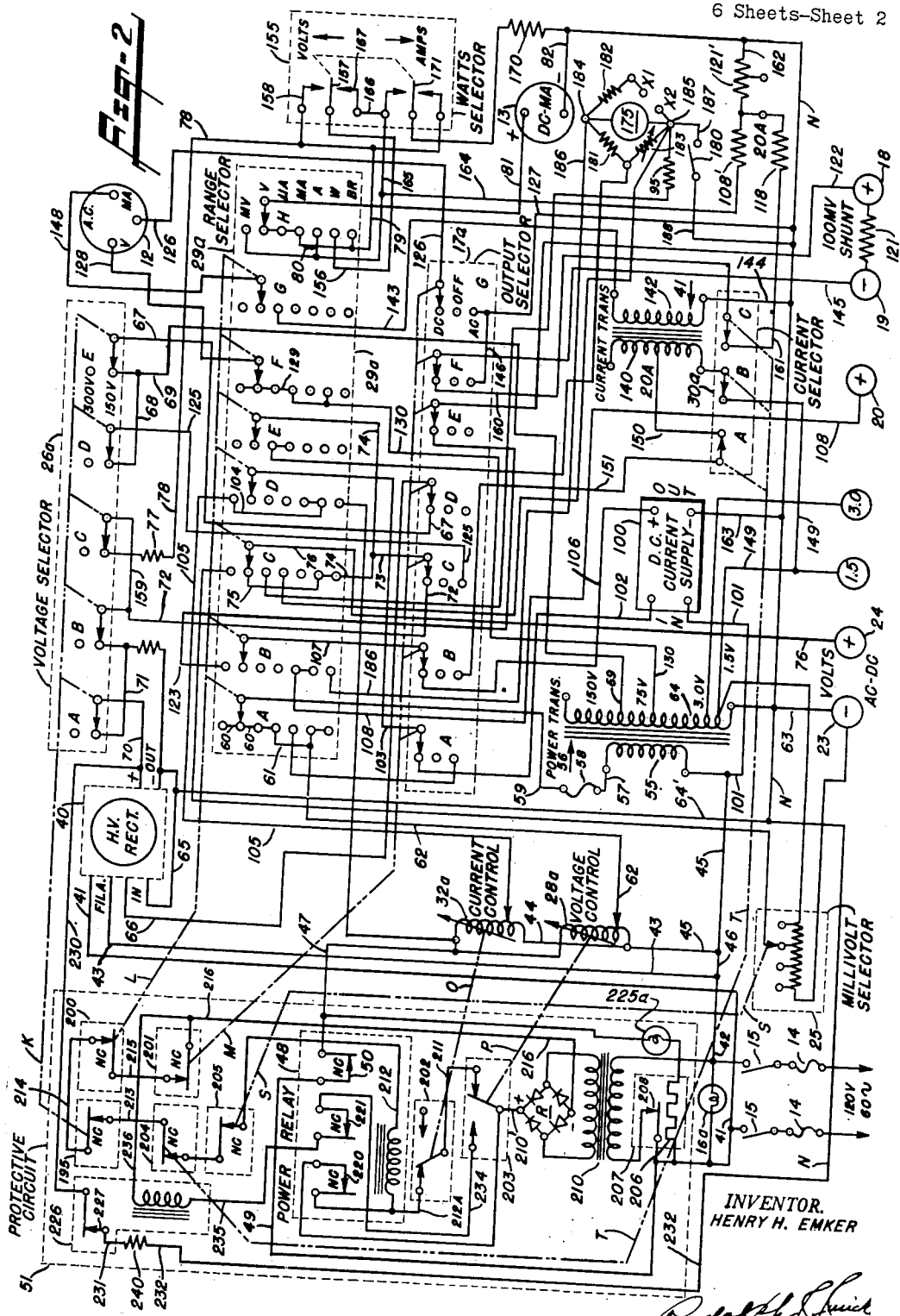
INVENTOR.
HENRY H. EMKER

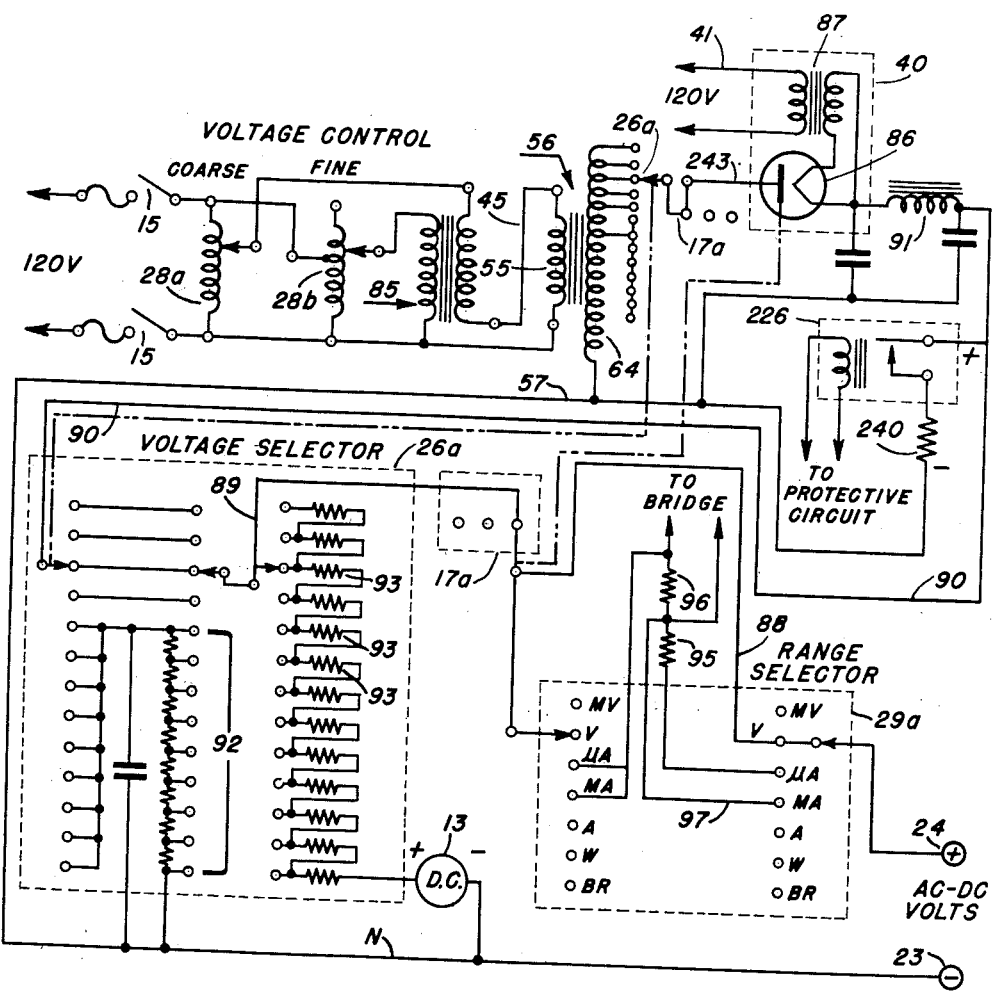

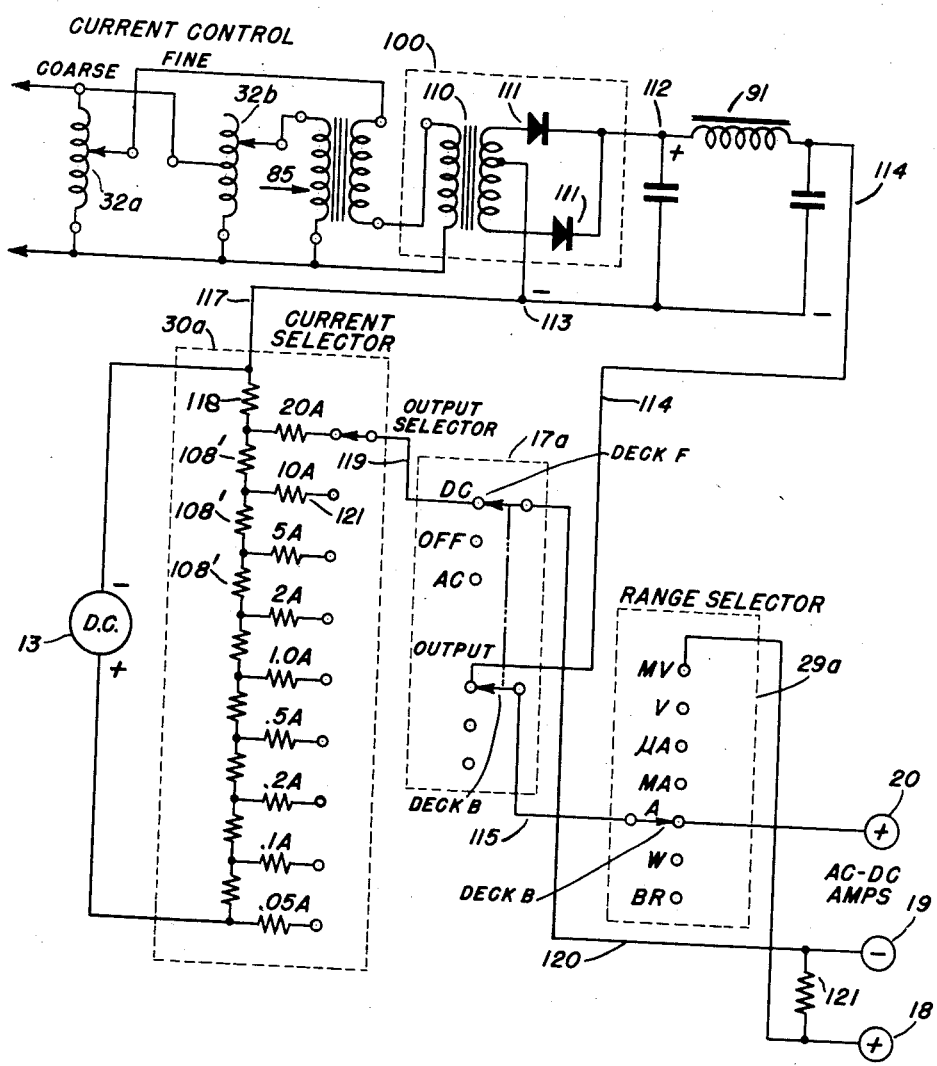

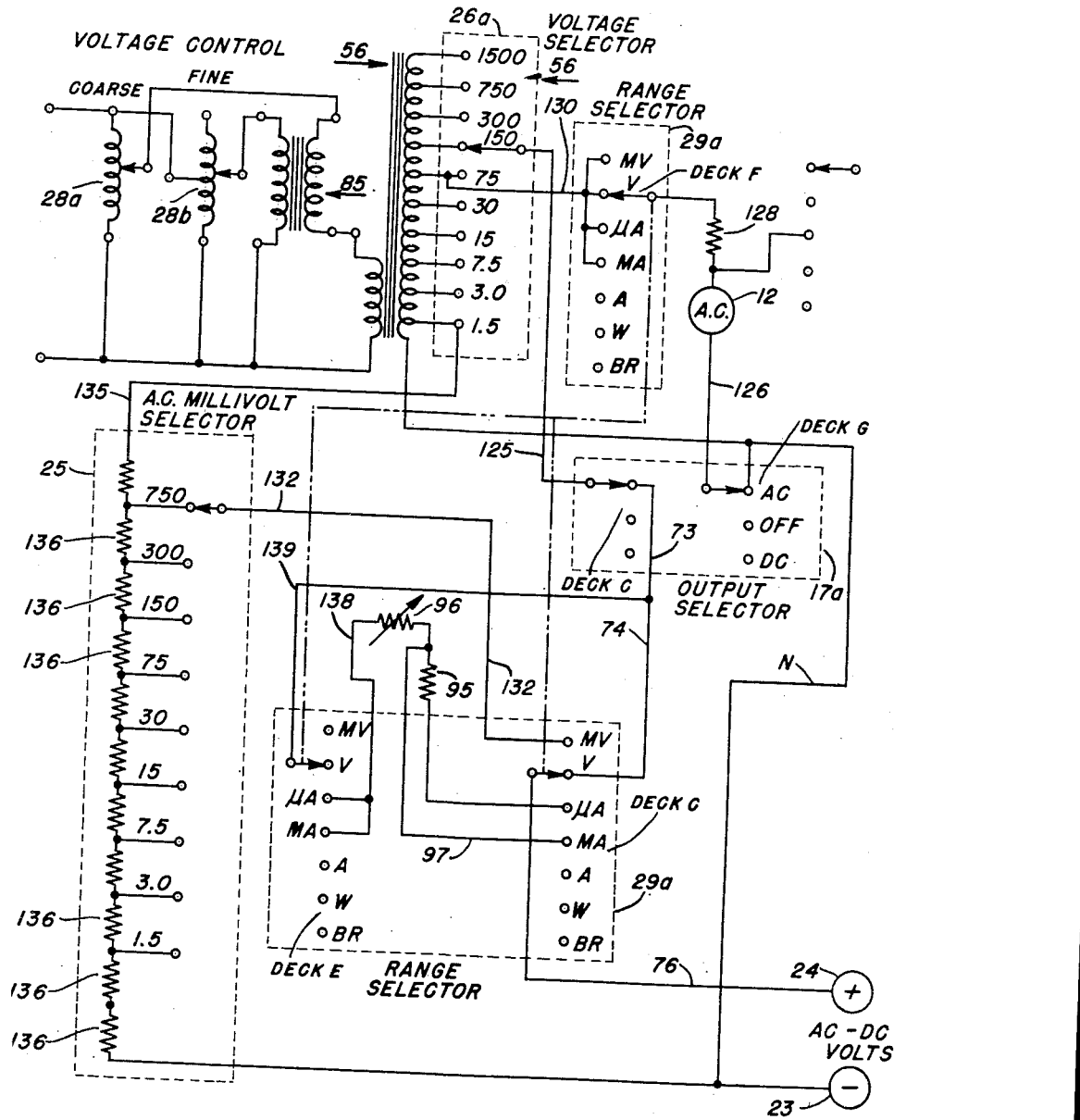

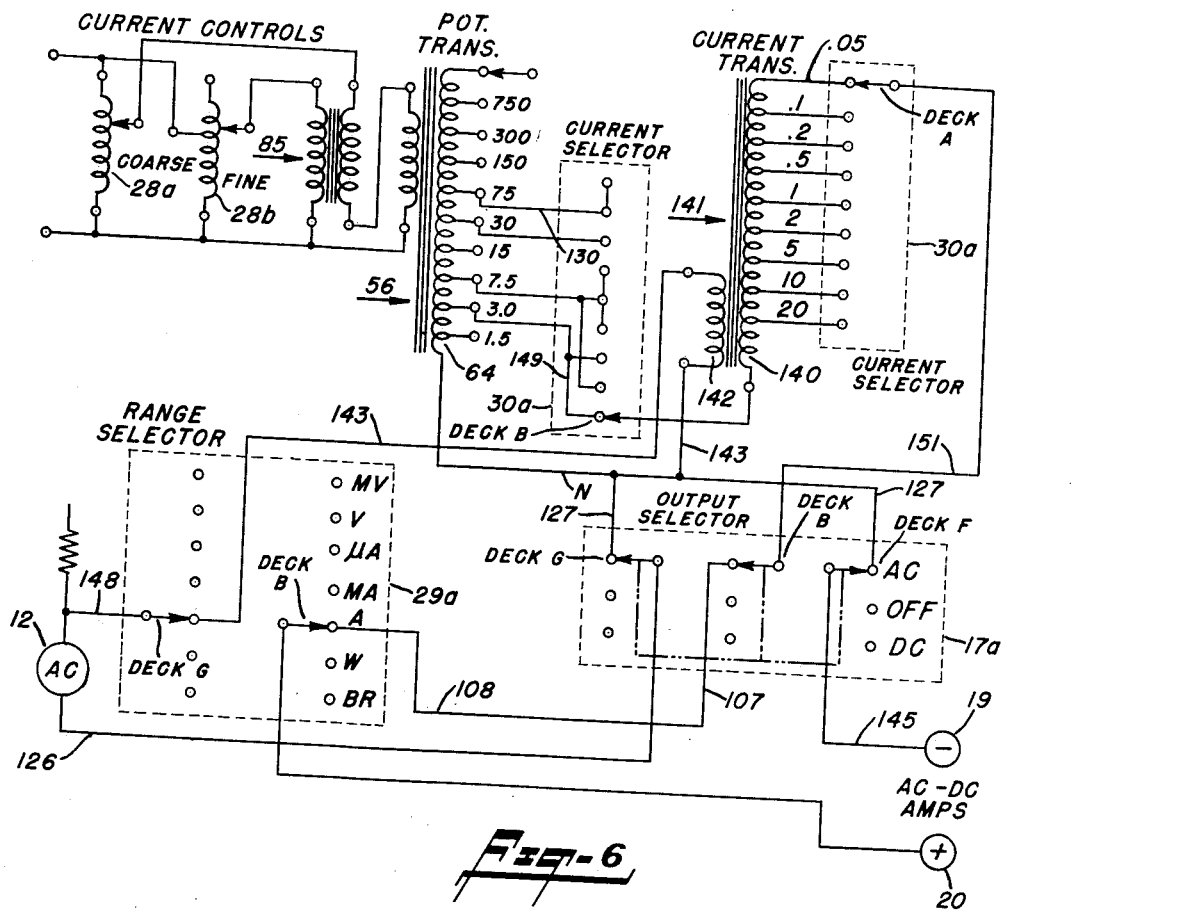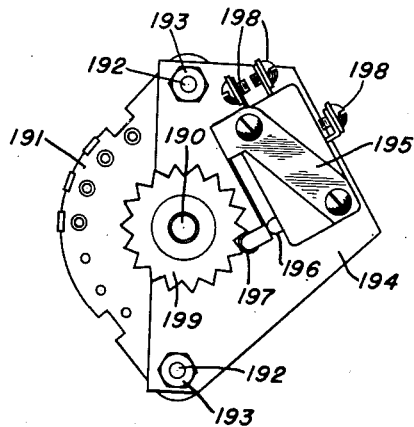

United States Patent Office 2,769,928
Patented Nov. 6, 1956

2,769,928

ELECTRICAL CALIBRATING AND TEST APPARATUS

Henry H. Emker, Lincoln Park, N. J., assignor to Radio Frequency Laboratories, Inc., Boonton, N. J., a corporation of New Jersey Application July 14, 1955, Serial No. 521,948

13 Claims. (Cl. 307—149)

This invention relates to an instrument calibration standard and more particularly to portable electrical apparatus including an arrangement of components and circuitry for supplying selected magnitudes of A.-C. and D.-C. voltages and currents to an instrument under calibration or test.

In the electrical field it is often desired to check the indicating accuracy of electrical instruments such as voltmeters, ammeters and wattmeters or to calibrate the scale of such instruments in the first instance. Also, it is often necessary to measure the ohmic resistance of such instruments and/or precision resistors. In view of the large variation in the character and ranges of instruments, the calibrating apparatus desirably should cover a wide range of operating values and should have a maximum factor of flexibility so that a given apparatus will be of more or less universal adaptability.

Calibrating apparatus of this general class is, of course, well known. It comprises suitable transformers, range multipliers, shunts, rectifiers, control elements and standard indicating instruments having a high precision, whereby accurately-measured alternating and direct current voltages and currents may be applied to the particular instrument under test or calibration. A Wheatstone bridge network may also be included to measure ohmic resistance values. However, such prior apparatus included components of such necessary multiplicity, size and weight that the overall apparatus occupies the area of a good sized work bench and therefore is not of a portable character.

An object of this invention is the provision of apparatus for use in the calibration and testing of electrical instruments and which includes a novel circuitry and utilization of necessary components whereby the apparatus can be housed in a relatively small, portable cabinet.

An object of this invention is the provision of an A.-C. and D.-C. calibrating apparatus that includes a novel safety feature designed to protect the operator against electrical hazards and to protect the equipment and the instrument being calibrated against damage, accidental or otherwise.

An object of this invention is the provision of calibrating apparatus for supplying selected magnitudes of alternating or direct current voltages or currents to an instrument under test and including a novel arrangement for the multiple use of numerous components thereby decreasing substantially the overall size, weight and cost of the apparatus.

An object of this invention is the provision of calibrating apparatus comprising a potential transformer having a primary winding and a tapped secondary winding, an adjustable transformer energizable from an A.-C. power line and providing a selectively-variable voltage to the primary winding of the potential transformer, a pair of output terminals to which an instrument under test may be connected, one of said terminals being connected to the secondary winding of the potential transformer, a range selector switch operable to connect a selected tap of the said secondary winding to the other said output terminal, and means effective upon movement of the range selector switch to disconnect the adjustable transformer from the power line.

An object of this invention is the provision of calibrating apparatus comprising a potential transformer having a primary winding and a tapped secondary winding, an adjustable control transformer for applying a variable voltage to the said primary winding when the control transformer is connected to an A.-C. power line, a normally-closed switch actuated by the adjustable member of the control transformer such that the switch contacts are open when the control transformer applies a voltage to the primary winding of the potential transformer, a protective relay having an operating coil and a set of normally-open contacts, circuit elements connecting the said control transformer to the power line through the said normally-open contacts of the protective relay, a pair of apparatus output terminals to which an instrument may be connected for calibrating purposes, a multi-position range selector operable to connect the said output terminals to a selected portion of the said tapped secondary winding and switch means arranged to momentarily open an electrical circuit as the range selector is moved from one position to another, said switch means and normally-closed switch being connected in series with the operating coil of the protective relay and across a source of electrical power for actuating the protective relay.

An object of this invention is the provision of calibrating apparatus comprising a potential transformer having a primary and a secondary winding, a pair of apparatus output terminals to which an instrument may be connected for calibrating purposes, a high voltage rectifier having an output circuit connected to said apparatus output terminals, a range selector switch operable to connect the input circuit of the rectifier to a selected portion of the said tapped secondary winding, an adjustable control transformer for applying a variable voltage to the primary winding of the potential transformer, a first normally-closed switch operable to momentarily open circuit position upon movement of the range selector switch from one position to another, a second normally-closed switch operable to the open-circuit position when the adjustable member of the control transformer is displaced from its zero position, a protective relay having an operating coil and two sets of normally-open contacts, a source of D.-C. voltage, leads connecting the operating coil of the protective relay across the source of D.-C. voltage through the said first and second normally-closed switches, leads connecting the said control transformer to a source of A.-C. power through one set of protective relay contacts, an auxiliary relay having an operating coil and a set of normally-closed contacts, leads connecting the operating coil of the auxiliary relay to the source of D.-C. voltage through the second set of protective relay contacts, a discharge resistor, and leads connecting the said discharge resistor across the output circuit of the said rectifier through the auxiliary relay contacts.

These and other objects and advantages will become apparent from the following description when taken with the accompanying drawings. It will be understood the drawings are for purposes of description and are not to be construed as defining the scope and limits of the invention, reference being had for the latter purpose to the claims appended hereto.

In the drawings wherein like reference characters denote like parts in the several views:

Figure 2 is a simplified circuit diagram of the apparatus;

Figure 3 is a functional circuit diagram of that part of the apparatus used to calibrate D.-C. voltmeters, D.-C. ammeters and D.-C. microammeters.

Figure 4 is a functional circuit diagram of that part of the apparatus used to calibrate D.-C. ammeters and D.-C. millivoltmeters;

Figure 5 is a functional circuit diagram of that part of the apparatus used to calibrate A.-C. voltmeters, A.-C. millivoltmeters and D.-C. milliammeters;

Figure 6 is a functional circuit diagram of that part of the apparatus used to calibrate A.-C. ammeters; and Figure 7 is a bottom view of a selector switch and the associated micro switch which forms part of the protective circuit of the apparatus.

Figure 1:
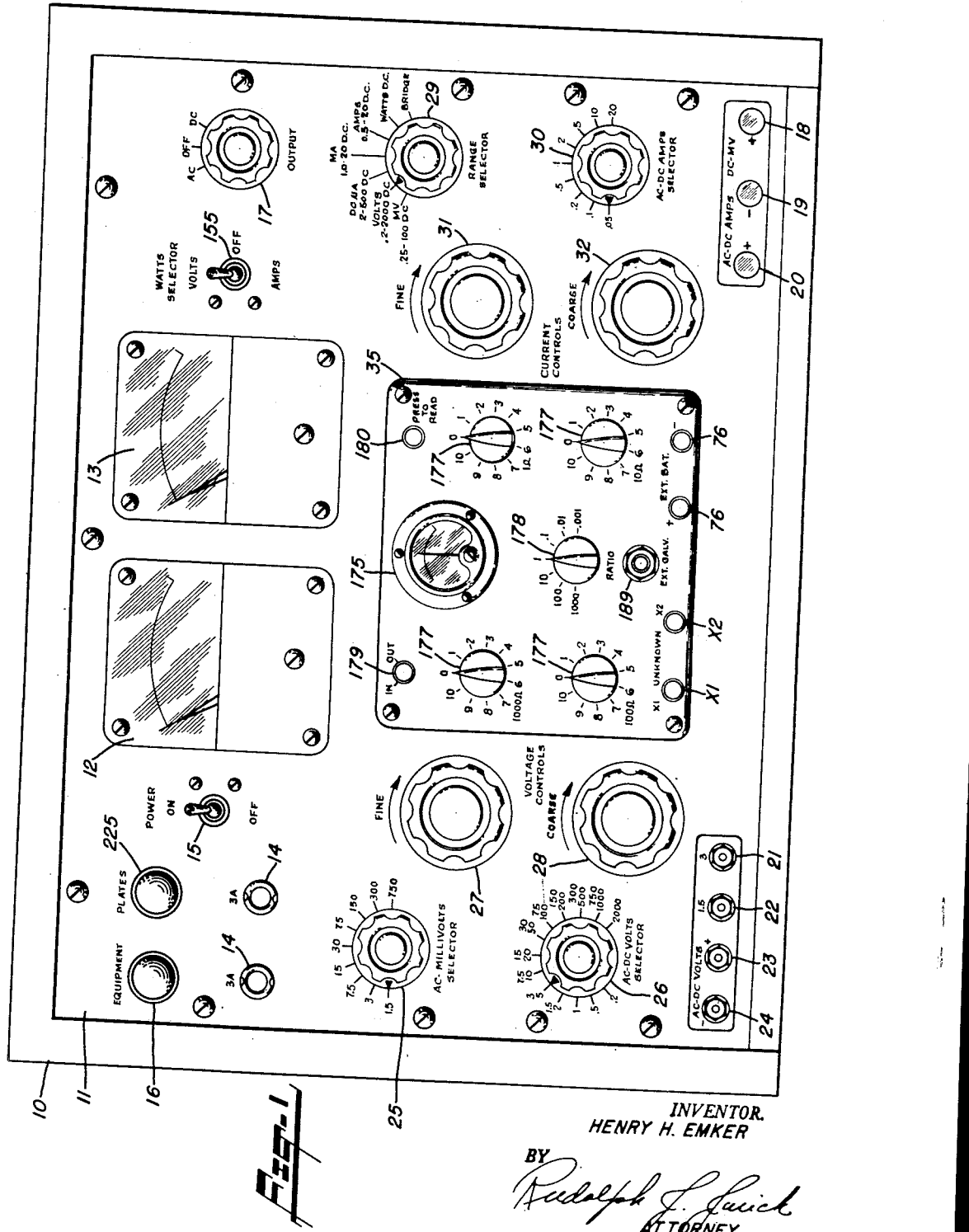
Figure 1 is an elevational view illustrating the front panel of the cabinet which houses the entire apparatus.

Reference is now made to Figure 1 wherein a metal cabinet 10 is closed by a front panel 11, the latter carrying the two reference instruments 12, 13, the various binding posts for connecting a test instrument to the apparatus and various knobs for applying selected magnitudes of voltage or current to the instrument under test. It may here be pointed out that the reference meter 12 is a precision iron vane type instrument and the meter 13 is a precision permanent magnet, movable coil type of instrument, each having an indicating accuracy of better than one (1) percent. Normally, the apparatus is energized by means of a connecting cable, not shown, carrying a plug for insertion into an electrical outlet connected to a conventional 120 volt, 60 cycle power line. Power is applied to the apparatus through the accessible fuses 14 upon closure of the line switch 15 and the power-on condition is indicated by a signal lamp disposed behind a bull's-eye lens 16. The knob 17 controls a suitable switch for applying either A.-C. or D.-C. voltages and/or currents to the apparatus output binding posts 18—24 such binding posts being appropriately marked. The apparatus output voltage ranges are selected by means of switches controlled by the knobs 25, 26 and 29, and the adjustment of the voltage magnitude within the selected range is controlled by variable transformers having sliders settable by the knobs 27, 28. Similarly, the apparatus output current ranges are selected by positioning switches controlled by the knobs 29 and 30 and the current magnitude is adjustable by means of transformers having sliders positionable by the knobs 31, 32. Those skilled in this art will understand that a setting of the range selector switches conditions the circuitry so that the appropriate reference instrument 12 or 13 will have a full scale deflection range corresponding to the selected range and that such instrument will indicate the magnitude of the voltage or current as established by a setting of the respective potential or current transformers controlled by the knobs 27, 28 and 31, 32. As indicated by the markings on the panel, the voltage and current magnitudes are subject to a coarse and a fine control, the latter being necessary to provide precise operation of the apparatus.

The apparatus includes a sub-panel 35 which carries the components for a Wheatstone bridge and decade resistor arrangement used for measuring the ohmic resistance of test instruments, etc.

Reference is now made to Figure 2 which is a simplified circuit diagram of the apparatus. The line switch 15, here shown as a double pole-single throw switch is shown in the open position. Closure of the line switch causes the signal lamp 16a to be energized. As described above, this signal lamp is positioned behind the lens 16 carried by the front panel and serves as a positive indication that the apparatus is energized. A high voltage rectifier 40 includes a step down transformer having a primary winding connected to the 120 volt line by the lead 41 and the leads 42, 43. While here shown only diagrammatically, the rectifier section will be described in detail hereinbelow with specific reference to Figure 3.

It will be noted that the voltage control variable transformer 28a and the current control variable transformer 32a each have one end connected to one side of the 120 volt line by the leads 44, 45, 46, 42. The other ends of these transformers are connected to the other side of the line by the lead 47, the closed contacts 50, of the power relay 48 and lead 49. A protective circuit, enclosed within the dotted line rectangle 51, is also connected to the power line but such circuit will be described hereinbelow. The simplified circuit diagram shows but one current control transformer 32a and one voltage control transformer 28a and it appears well to here point out that actually each of these transformers consists of two sections, one for coarse and one for fine adjustment and that such respective sections are respectively controlled by the knobs 28, 27 and 32, 31, see Figure 1.

The character of the apparatus output is determined by the setting of the Output Selector switch 17a, said switch consisting of seven decks A–G with the individual movable contacts attached to, but insulated from, a single shaft, the latter being rotatable by the knob 17 shown in Figure 1. In Figure 2 the switch 17a is shown set in the D.-C. position and under such setting only D.-C. voltages or currents will be available from the output binding posts of the apparatus. The specific D.-C. current or voltage ranges made available at the output binding posts is determined by the setting of the Range Selector switch 29a consisting of eight (8) decks each having movable contacts simultaneously controlled by the knob 29 shown in Figure 1. In Figure 2 only the character of the electrical quantity is indicated such as, MV (millivolts), V (volts), μA (microamperes), MA (milliamperes), A (amperes), W (watts) and BR (bridge). The latter two switch positions condition the circuitry for the calibration of wattmeters and for the bridge measurement of resistance values, which circuits will be described hereinbelow. The actual magnitude ranges of the other switch settings are shown in Figure 1. Thus, with the Range Selector switch set as shown in Figure 2 a voltage of 0–2000 volts can be made available at the output voltage binding posts 23, 24. The specific available voltage range is selected by a setting of Voltage Selector switch 26a, which comprises five (5) decks each having movable contacts simultaneously positionable by the knob 26 shown in Figure 1. Attention is directed to the fact that the index pointer of the knob 26 is alineable with any one of numerous marks carried on the front panel of the apparatus. Such marks indicate the actual range of the variable voltage available at the voltage output binding posts. In Figure 2 only the 300 and 150 volt switch positions are shown in the interest of simplifying the drawing; the switch actually being shown set to the 150 volt position.

Thus, with the Output Selector switch 17a, the Range Selector switch 29a and the Voltage Selector switch 26a, all set in the positions shown in Figure 2, a D.-C. voltage, adjustable in magnitude from 0–150 volts, is available at the output binding posts (terminals) 23, 24. The voltage adjustment is obtained by rotation of the slider of the Voltage Control autotransformer 28a which controls the voltage applied to the primary winding 55 of the power transformer 56, the circuit being traceable as follows: lead 45, transformer winding 55, lead 57, fuse 58, lead 59, movable contact of deck Ⓐ of the Range Selector switch 60, jumpers 61, and lead 62. When the Output Selector switch 17a is set to the D.-C. position the output of the high voltage tube rectifier 40 is connected to the output terminals 23, 24. It will be noted that the output terminal 23 is connected to the common bus N by the lead 63 and that one end of the transformer secondary winding 64 is also connected to such bus. The rectifier input (constituted by one side of the filament and the anode) is shown connected across the 150 volt tap on the transformer secondary winding, the circuit being traceable as follows: lead 64′ (connected to the common bus N), lead 65, lead 66, movable contact of deck Ⓓ of Output Selector switch 17a, lead 67, movable contact of deck Ⓑ of Voltage Selector switch 26a, and leads 68, 69. The (+) output side of the rectifier 40 is connected to the apparatus output terminal 24 by the lead 70, movable contact of deck Ⓐ of Voltage Selector switch 26a, lead 71, movable contact of deck Ⓑ of the same switch, lead 72, movable contact of deck Ⓒ of Output Selector switch 17a, leads 73, 74, jumpers 75, movable contact of deck Ⓒ of Range Selector switch 29a, and lead 76. Under this circuit condition, the standard, or reference instrument 13 is connected to the apparatus output terminals 23, 24 through an appropriate voltage drop resistor, the circuit being traceable as follows: (+) terminal 24, lead 76, movable contact of deck Ⓒ of Range Selector switch 29a, jumper 75, leads 74, 73, movable contact of deck Ⓒ of Output Selector switch 17a, leads 72 and 159, movable contact of deck Ⓒ of Voltage Selector switch 26a, voltage dropping resistor 77, leads 78, 79, jumpers 80, movable contact of deck Ⓗ of Range Selector switch 29a, lead 81, instrument 13 and lead 82 that is connected to the common bus N. It is here pointed out that the reference instrument 13 is internally adjusted to provide a full scale deflection of the pointer at 1 milliampere and 100 millivolts, and the series resistor 77 is calibrated such that full scale pointer deflection is obtained when the voltage at the apparatus output terminals 23, 24 is 150 volts.

Having now given a detailed description of the conditioning of the circuitry for providing 150 volts D.-C., adjustable from 0–150 volts, at the output terminals, reference is made to Figure 3 which is an actual circuit diagram of the circuits utilized for calibration of D.-C. voltmeters, D.-C. milliammeters and D.-C. microammeters. Here the coarse and fine voltage controls 28a and 28b, respectively, are shown. The output of the voltage control 28a is applied directly to the secondary winding of the intermediate transformer 85 and the primary winding 55 of the potential transformer 56, the latter two windings being connected in series. The output of the voltage control 28b is applied to the primary winding of the intermediate transformer. There is thus obtained a fine adjustment of the voltage applied to the primary winding of the transformer 56. The high voltage rectifier 40 comprises the tube 86 having a filament energized by the secondary winding of a step-down transformer 87 and the anode connected to an appropriate tap on the secondary winding 64 of the potential transformer when the Output Selector switch 17a and the Voltage Selector switch 26a are set as described with reference to Figure 2. The rectified voltage output of the rectifier 40 is applied across the apparatus output terminals 23, 24 it being noted that the negative (−) terminal 23 is connected directly to the end of the transformer secondary winding 64 by the common bus N. The positive (+) terminal 24 is connected to the rectifier filament through the Range Selector switch 29a, lead 88, Output Selector switch 17a, lead 89, Voltage Selector switch 26a, lead 90 and choke coil 91. As is known in this art, the resistors 92 are connected between the common bus N and the positive side of the rectifier to obtain a predetermined division of the rectifier output voltage upon proper setting of the Voltage Selector switch. The standard instrument 13 has its negative side connected to the common bus N and its positive side connected to the lead 89 through a selected one, or combination, of the calibrated resistors 93. It will, therefore, be apparent that a setting of the Voltage Selector switch 26a to obtain a desired voltage division also results in a proper selection of the resistors 93 whereby the deflection range of the instrument corresponds to the selected voltage range.

The circuit shown in Figure 3 is also that part of the apparatus utilized to calibrate a D.-C. microammeter that may be connected to the output terminals 23, 24. In this case, the range selector switch 29a is set to the A mark which connects the 90,000 ohm fixed resistor 95 and the decade 10,000 ohm resistor 96 between the positive terminal 24 and the positive lead of the rectifier. The resistance of the instrument being calibrated is first measured and subtracted from the decade resistor 96 to make the total circuit resistance 100,000 ohms. The current in microamperes supplied to the instrument being calibrated is read directly from a suitable scale on the standard instrument 13, such scale being calculated, in the first instance, by dividing the selected voltage by 100,000.

To calibrate a D.-C. milliammeter connected to the terminals 23, 24, the Range Selector switch 29a is set to the MA position. This by-passes the 90,000 ohm fixed resistor 95, by lead 97, whereby only the decade resistor 96 is in series with the test instrument. In this case the scale of the standard instrument is calculated by dividing the selected voltage by 10,000.

Reference is again made to Figure 2 for a description of the circuit set up for calibrating a D.-C. ammeter or a D.-C. millivoltmeter, the apparatus output terminals used for these purposes being those numbers 18, 19 and 20, see also Figure 1. For calibrating direct current instruments in amperes or millivolts the basic components of the circuit consists of a full wave current supply, current-limiting resistors and a precision shunt. For present purposes the full wave D.-C. current supply is shown as a block 100 having an input and an output. One of the input terminals is connected to one end of the Current Control 32a, by the wires 101, 45 and 44; the other input terminal is connected to the adjustable contact of the Current Control by the lead 102, movable contact of deck Ⓐ of Output Selector switch 17a, lead 103, movable contact of deck Ⓓ of Range Selector switch 29a, lead 104 (it now being assumed the Range Selector switch is set at the A mark) and lead 105. Thus, the adjustment of the transformer constituting the Current Control 32a, determines the voltage applied to the D.-C. current supply 100. The positive (+) output terminal of the supply 100 is connected to the positive apparatus terminal 20, the circuit being traceable as follows: lead 106, movable contact of deck Ⓑ of Output Selector switch 17a, lead 107, movable contact of deck Ⓑ of Range Selector switch 29a, and lead 108. The negative (−) output terminal of the supply 100 is connected to the common bus N. The net result is a circuit arrangement wherein the current output of the supply 100 is applied to the instrument under test through the standard instrument 13 and an appropriate shunt 108 as will become more apparent from Figure 4.

As shown in Figure 4, the Current Control comprises a first variable transformer having its slider connected to the secondary winding of the intermediate transformer 85 and a second variable transformer having its slider connected to the primary winding of the intermediate transformer. The similarity of this portion of the circuit with that shown in Figure 3 will be apparent. The connection of either the two voltage control transformers 28a and 28b (shown in Figure 3) or the two current control transformers 32a and 32b (shown in Figure 4) to the intermediate transformer 85, is accomplished through the various decks of the Range Selector switch 29a (see Figure 1). In either case a coarse and fine adjustment of the voltage output of the intermediate transformer is obtained.

As shown in Figure 4, the current supply 100 comprises a transformer 110 having a center-tapped secondary winding connected to the rectifiers 111 to provide a full wave rectified voltage across the terminals 112, 113. The positive (+) terminal 112 is connected to the apparatus output terminal 20 through the choke coil 91, lead 114, deck Ⓑ of the Output Selector switch 17a, lead 115 and deck Ⓑ of the Range Selector switch 29a. The negative (−) terminal 113 is connected to the apparatus output terminal 19 as follows: lead 117, shunt 108', current-limiting resistor 118, the movable contact of the Current Selector switch 30a (see also Figures 1 and 2), lead 119, deck Ⓕ of the Output Selector switch 17a, and lead 120. Those skilled in this art will understand that when switch 30a is set to a given mark as, for example, 20 A, the shunt resistor network connected across the standard instrument is set up so that the pointer of the instrument will indicate full scale on an appropriate scale when a current of 20 amperes D.-C. is flowing through a test instrument connected to the apparatus terminals 19 and 20. On the other hand, a setting of the switch to the .5 A mark conditions the circuit for a full scale indication on the standard instrument when a D.-C. current of ½ ampere flows through the test instrument.

Reference is again made to Figure 2 with attention directed to the 100 mv. shunt 121 connected directly across apparatus output terminals 18 and 19 (see also Figure 1). In order to calibrate a D.-C. millivoltmeter such meter is connected across the terminals 18, 19 and the Range Selector switch 29a is set to the MV position. In this position of the switch 29a, the right hand side of the shunt resistor 121 is connected to the positive (+) terminal of the D.-C. current supply 100, the circuit being traceable as follows: lead 122, deck Ⓑ of Output Selector switch 17a, lead 123, deck Ⓑ of Range Selector switch 29a, lead 107, deck Ⓑ of Output Selector switch and lead 106. The other side of the shunt resistor 121 is connected to the negative (−) side of the D.-C. current supply 100 by reason of its connection to the negative (−) apparatus output terminal 19, as has already been described with particular reference to Figure 4. As shown in Figure 4, the positive (+) side of the 100 mv. shunt resistor 121 will be connected to the lead 115 when the Range Selector switch 29a is set to the MV position. Consequently, the shunt resistor arrangement associated with the standard instrument 13 remains unchanged. It will, therefore, be apparent that when the Current Selector switch 30a is set to the 20 A position, the standard instrument 13 will indicate full scale when a current of 20 amperes flows through the shunt 121 and that the shunt resistance can be set precisely so that the voltage drop across the shunt is exactly 100 millivolts with 20 amperes flowing therethrough.

The circuit arrangement for calibrating A.-C. voltmeters will now be described with reference again made to Figure 2. The instrument to be calibrated is connected to the apparatus output terminals 23, 24, the Output Selector switch 17a is set to the A. C. position, the Range Selector switch 29a is set to the V position and the Voltage Selector switch 26a is set to the desired range, as for example, the 150 v. range shown in the drawing. Under such circuit arrangement the positive (+) apparatus output terminal 24 is connected to the 150 volt tap on the secondary winding 64 of the potential transformer 56, the circuit being traceable as follows: lead 76, deck Ⓒ of Range Selector switch 29a, jumper 75, lead 74, deck Ⓒ of Output Selector switch 17a, deck Ⓓ of Voltage Selector switch 26a, and lead 69. The negative (−) apparatus output terminal 23 is connected to the common bus N to which one end of the secondary winding 64 (of the potential transformer 56) is also connected. As has already been described, the Voltage control 28a controls the voltage applied to the potential transformer primary winding 55 and, consequently, the magnitude of the voltage applied to the apparatus output terminals 23, 24. In calibrating instruments on alternating current values the standard instrument 12 is used as a reference such instrument having a full scale sensitivity of 75 volts A.-C. or 75 milliamperes A.-C. When the Output Selector switch 17a is set to the AC position, one side of the reference instrument 12 is connected to the negative (−) apparatus output terminal 23, the circuit being traceable as follows: lead 126, deck Ⓖ of Output Selector switch 17a, lead 127 and common bus N. The other side of the reference instrument is connected to the 75 volt tap on the secondary winding 64 of the potential transformer, the circuit being traceable as follows: lead 128, deck Ⓕ of Range Selector switch 29a, jumpers 129, and lead 130. It may here be pointed out that the potential transformer 56 is an accurately wound and tapped unit and that the reference instrument 12 is provided with an arrangement of voltage scales which correspond to, or are multiples of, the voltage values obtainable from the various transformer taps. Consequently, in the illustrated case, the user will read the 150 scale range of the instrument 12 to obtain the actual voltage across the apparatus output terminals, even though, internally, the instrument 12 is energized from the 75 volt transformer tap.

The A.-C. voltmeter calibrating circuitry, described immediately above, is shown in the functional circuit diagram of Figure 5. Here, the negative (−) apparatus terminal 23 is shown connected to one end of the secondary winding of the potential transformer 56 by the common bus N. The positive (+) apparatus terminal 24 is connected to the 150 volt tap by the lead 76, deck Ⓒ of Range Selector switch 29a, lead 74, lead 73, deck Ⓒ of Output Selector switch 17a, and lead 125; the identifying numerals being identical to those shown in Figure 2. Also, the reference instrument 12 is shown connected between the apparatus terminal 23 and the 75 volt tap on the potential transformer by the common bus N, deck Ⓖ of Output Selector switch 17a, lead 126, lead 128, deck Ⓕ of Range Selector switch 29a and lead 130.

Continued reference is made to Figure 5 for a description of the circuit arrangement for calibrating an A.-C. millivoltmeter connected to the apparatus output terminals 23, 24. In such case, the Range Selector switch 29a is set to the MV position which disconnects the apparatus output terminal 24 from the Voltage Selector switch and connects such terminal to the AC millivolt selector switch 25. It will be noted that deck Ⓕ of the Range Selector switch 29a includes a jumper tying together the MV, V, μA and MA switch positions. Consequently, the reference instrument 12 remains inserted between the negative (−) apparatus terminal 23 and the 75 volt secondary tap whenever the Range Selector switch is set to any of these positions. The position of the Output Selector switch 17a remains unchanged since we are interested in calibrating the test instrument on alternating current values; namely, millivolts. For A.-C. millivolts, then, the positive (+) apparatus output terminal 24 is connected as follows: lead 76, deck Ⓒ of Range Selector switch 29a which is now in the MV position, lead 132, AC Millivolt Selector switch 25 (see also Figures 1 and 2), A.-C. millivolt voltage divider 134, and lead 135. The AC Millivolt Selector switch 25 comprises a movable contact cooperating with a number of stationary contacts that are connected to calibrated resistors 136 forming a voltage divider network. Thus, when the AC Millivolt Selector switch is set to the 750 mark, 750 millivolts A.-C. will be applied across the apparatus terminals 23, 24 when the reference instrument 12 indicates full scale reading on an appropriately calibrated scale. Other such calibrated scales are provided to correspond to the millivolt ranges of the AC Millivolt Selector switch, or multiples thereof.

The functional circuit diagram of Figure 5 also serves to illustrate the circuit arrangement for calibrating an A.-C. milliammeter connected to the apparatus output terminals 23 and 24. In this case the Range Selector switch 29a is set to the MA position yet the reference instrument 12 remains connected between the negative (−) terminal 23 and the 75 volt tap on the potential transformer, as before. Now, however, the apparatus positive (+) terminal 24 is connected to the movable contact of the Voltage Selector switch 26a through the decade resistor 96, the circuit being traceable as follows: lead 76, deck Ⓒ of Range Selector switch 29a (now closed to the MA position), lead 97, decade resistor 96, lead 138, deck ⒷⒷ of Range Selector switch 29a, lead 139, lead 73, deck Ⓒ of Output Selector switch 17a, and lead 125. The resistance of the test instrument is first measured and subtracted from the decade resistor 96 to make a total circuit resistance of 10,000 ohms. Using this 10,000 ohm total resistance the milliampere output for each voltage range selected by a positioning of the Voltage Selector switch 26a is calculated and the scale of the reference instrument 12 marked accordingly. To calibrate a test instrument (connected across the apparatus output terminals 23, 24) on A.-C. microamperes, the Range Selector switch 29a is set to the μA position which modifies the circuit only so as to connect the 90,000 ohm fixed resistor 95 in series between the output terminal 24 and the decade resistor 96. The microamperes flowing in the test instrument are read directly from a suitable scale on the standard instrument 12, such scale being calibrated by dividing the selected voltage range (as determined by the setting of the Voltage Selector switch 26a) by 100,000.

To calibrate a test instrument on A.-C. amperes, such instrument is connected to the current output terminals 19, 20, see Figure 2, the Output Selector switch 17a is set to the AC position, the Range Selector switch 29a is set to the A position, and the Current Selector switch 30a is set to the desired range by rotation of the knob 30 (see Figure 1) to the proper marking on the panel of the apparatus. Such setting of the Output Selector switch 17a conditions the circuit so that a selected tap on the primary winding 140, of the current transformer 141, can be connected in series with certain of the secondary windings 64 of the potential transformer 56. The secondary winding 142, of the current transformer, supplies current to the standard, or reference, instrument 12, the circuit being traceable as follows: from the upper end of the said secondary winding, lead 143, deck Ⓖ of Range Selector switch 29a, lead 148, instrument 12, lead 126, deck Ⓒ of Output Selector switch 17a, lead 127, common bus N, and lead 144. Thus, the reference instrument 12 will deflect to an extent depending upon the turns ratio between the current transformer secondary winding 142 and primary winding 140, the turns of the latter depending upon the setting of deck Ⓐ of the Current Selector switch 30a. The test instrument, however, forms a closed circuit with the current transformer primary winding 140 and the potential transformer secondary winding, this circuit being traceable as follows: beginning at the negative (—) apparatus terminal 19, lead 145, deck Ⓓ of Output Selector switch 17a, lead 146, lead 127, common bus N, lower end of potential transformer winding 64, the 1.5 volt tap lead 149, lead 150, deck Ⓑ of Current Selector switch 30a, current transformer primary winding 140, lead 150 connected to the 20 A tap, deck Ⓐ of Current Selector switch 30a, lead 151, deck Ⓑ of Output Selector switch 17a, lead 107, deck Ⓑ of Range Selector switch 29a, and lead 108 that connects to the positive (+) apparatus terminal 20.

The immediately preceding circuitry (for the calibration of a test instrument on A.-C. amperes) is also shown in the functional circuit diagram of Figure 6 wherein the connections of the current and potential transformer windings are more readily followed. It is believed a detailed description of the Figure 6 circuit is unnecessary since the circuit arrangement and the reference characters are identical to those just described with specific reference to Figure 2. It is deemed necessary only to point out that the characteristics of the reference instrument 12 are such that the pointer will deflect to the full scale mark when 75 milliamperes flows through the instrument. The actual calibration of the scales, however, are in terms of amperes. Thus, when the Current Selector switch 30a is at the .05 mark, as indicated in Figure 6, the current flowing through the test instrument flows through the entire secondary winding 140 of the current transformer.

When the magnitude of such current is .05 ampere, exactly 75 milliamperes will flow through the reference instrument 12 whereupon the pointer will be aligned with the full scale mark position on an appropriately calibrated scale. By "appropriately calibrated scale," I here mean one on which the cardinal lines are marked so as to afford an accurate reading of any current magnitude in the range of 0–.05 ampere. When, however, the Current Selector switch 30a is set to the other extreme position; namely, the 20 A mark, the current flowing through the test instrument will flow only through a relatively few number of turns of the current transformer winding 140. The actual number of turns now effective is such that 75 milliamperes will flow through the reference instrument 12 when a current of 20 amperes flows through the test instrument. Now, the actual magnitude of the current flowing in the test instrument can be read from the position of the pointer of the reference instrument relative to another appropriately marked scale.

The point here being made is that the reference instruments 12 and 13 are each provided with an arrangement of scales marked in different voltage and current ranges so that the operator can read that scale having a full scale indication corresponding to the magnitude marking to which the Voltage Selector or Current Selector is set. The character of the factor being measured; namely, A.-C. or D.-C. will, of course, depend upon the setting of the Output Selector switch.

The apparatus is also adapted for checking or calibrating wattmeters. Most electrodynamometer A.-C. wattmeters can be checked by applying D.-C. voltages and currents thereto. When the Output Selector switch 17a, Figure 2, is set to the DC reference mark and the Range Selector switch 29a is set to the W position, both the voltage and current functions of the apparatus are active. A meter under test has its potential coils connected to the apparatus output terminals 23, 24 and its current coil connected to the terminals 19, 20. The D.-C. reference instrument 13 is selectively connectable in either the multiplier circuit of the voltage side or the shunt circuit of the current side by operation of the normally-open, double-pole, double-throw Watts Selector switch 155. As the instrument is transferred from one circuit to the other an equivalent resistance is connected in its place in order not to change the output current or voltage while one or the other is being adjusted.

As shown in Figure 2, the transfer of the reference instrument 13 from the voltage-measuring function to the current-measuring function is accomplished by means of the Watt Selector switch 155 (see Figure 1), which is of the toggle or scoop action type. When such switch is closed in the up (Volts) position, the positive (+) side of the instrument 13 is connected to the positive (+) output terminal of the high voltage rectifier 40, the circuit being traceable as follows: lead 81, deck Ⓗ of Range Selector switch 29a (now set to the W position), lead 156, closed contacts 157, 158 of the switch 155, lead 78, resistor 77, deck Ⓒ of Voltage Selector switch 26a (shown set to the 150 volt position), lead 159, deck Ⓑ of Voltage Selector switch, lead 71, deck Ⓐ of Voltage Selector switch and lead 70. The positive (+) apparatus output terminal 24 is also connected to the positive (+) output terminal of the rectifier 40, as follows: lead 76, deck Ⓒ of Range Selector switch 29a (now closed to the W position), leads 74 and 73, deck Ⓒ of Output Selector switch 17a, and lead 72 which connects to lead 159. The negative (—) side of the reference instrument 13 is connected to the negative (—) apparatus terminal 23 by the lead 82, common bus N, and the lead 63, such terminal also being connected to the negative (—) output terminal of the rectifier 40 by the lead 64. Thus, as has been described hereinabove in detail with reference to Figure 3, the magnitude of the D.-C. voltage appearing across the apparatus output terminals 23, 24 is controlled by adjustment of the Voltage Control 28a and the indicating range of the instrument 13 is established by a selected setting of the Voltage Range switch 26a. Such setting of the Voltage Selector switch 26a connects the instrument 13 to a corresponding one of the instrument multiplier resistors 93, see Figure 3. Having now applied a selected voltage to the potential coils of the wattmeter under test the operator throws the Watt Selector switch 155 to the lower (AMPS) position whereupon the reference instrument 13 is disconnected from the voltage side of the apparatus and connected in the shunt circuit associated with the apparatus output terminals 19, 20, current being furnished by the DC Current Supply 100. Specifically, current from the positive (+) terminal of the current supply 40 flows through the lead 106, closed contacts of deck Ⓑ of Output Selector switch 17a, lead 107, closed contacts of deck Ⓑ of Range Selector switch 29a, lead 108, the current coils of the wattmeter under test and connected to apparatus terminal 19, 20, lead 145, deck Ⓕ of Output Selector switch 17a, lead 160, deck Ⓒ of Current Selector switch 30a, lead 161, current limiting resistor 118, resistors 121', lead 162, common bus N, and lead 163 to the negative (—) side of the current source 100. It will be noted that the current flowing through the current limiting resistor 118 divides a portion flowing through the path just described and a portion flowing through the remainder of the shunt 108, lead 164, lead 165, jumper 166, now-closed contacts 167, and 157 of the Watt Selector switch 155, lead 156, deck Ⓓ of Range Selector switch 29a, lead 81, reference instrument 13 and lead 82. The ratio of the current flowing through these two paths depends upon the arrangement of the shunt circuit as selected by a positioning of the Current Selector switch 30a, and has already been described with reference to Figure 4. In any event, the magnitude of the current supplied to the instrument under test is controlled by an adjustment of the Current Control 32a and the indicating range of the reference instrument 13 is set by a positioning of the Current Selector switch 30a. As shown in Figure 2, the resistor 170 is connected between the common bus N and the movable contact 171 of the Watt Selector switch 155. When the Watt Selector switch 155 is set to the Volts position, the resistor 170 is placed across the shunt network comprising the resistors 108 and 121. The value of the resistor 170 is so predetermined that the resistance of the current circuit remains unchanged when the reference instrument is taken out of the current circuit and transferred to the voltage circuit upon operation of the Watt Selector switch from the AMPS to the Volts position.

Reference is again made to Figure 1. The sub-panel 35 carries a galvanometer 175, a pair of battery terminals 176, a pair of bridge-arm terminals X1 and X2, an arrangement of knobs 177 controlling the decade resistance, a ratio-multiplier knob 178, a two-position switch 179 and a push-button switch 180. These components, together with certain fixed resistors constitute a Wheatstone bridge for the measurement of the ohmic resistance value of a resistance connected across the terminals X1 and X2. Provision is made for inserting an external galvanometer into jack 189. The bridge may be energized by an external battery connected to the terminals 176 and an appropriate setting of the switch 179. However, the bridge may be energized by the internal voltage source upon setting of the switch 179 to its other position as will now be described.

As shown in Figure 2, the bridge comprises the two fixed resistance arms 181, 182, the calibrated decade resistor here represented by the adjustable resistor 183, and the resistance under measurement, that is, the resistor connected to the bridge terminals X1, X2. The bridge output galvanometer 175 is inserted across the bridge output diagonals and will deflect in one direction or the other upon bridge unbalance when a voltage is applied across the opposite bridge diagonals 184, 185 upon closure of the push-button switch 180. Energy for energizing the bridge is obtained from the D.-C. current supply 100 when the Output Selector switch 17a is set to the DC position and the Range Selector switch 29a is set to the BR position, the circuit being traceable as follows, starting from the positive (+) output terminal of the supply 100; lead 106, deck Ⓑ of Output Selector switch 17a, lead 107, deck Ⓑ of Range Selector switch 29a (now closed in the BR position), lead 186, the bridge, lead 187, switch 180, lead 188, common bus N and lead 163. The value of the unknown resistance connected across the bridge terminals X1—X2 will be equal to that of the setting of the calibrated decade resistor 96 (or multiple or submultiple thereof) when the bridge is balanced.

I here wish to point out that the decade resistor 183 alone and the combination of the decade resistor and the fixed resistor 95 are utilized respectively in the circuit for calibrating a test instrument on D.-C. milliamperes and D.-C. microamperes as shown in Figure 3.

From the above description, it will be clear that numerous A.-C. or D.-C. voltages and currents can be obtained from the apparatus upon conditioning of the circuitry by a proper setting of the various control switches. A novel protective circuit is incorporated into the apparatus to protect the operator against electrical hazards and to protect the equipment and instruments being calibrated against damage upon improper use of the apparatus. The protective circuits serve two functions; namely, to disconnect all voltage and current supplies if the selector switches are moved when the voltage and current controls are in any position other than zero and to instantaneously discharge the D.-C. voltage at the apparatus output terminals when the coarse voltage control is returned to zero, or when the D.-C. selector switches are moved to another position, or when the equipment power is turned off. Once the voltage and current supplies are disconnected upon a movement of the selector switches, such supplies remain disconnected until the voltage and current controls are returned to their zero positions. However, upon return of the voltage and current controls to the zero position the supplies are then automatically reconnected into the circuit. The operation of the protective circuit is accomplished by means of micro-switches that are mechanically attached to the various selector switches and actuate suitable relays.

Before proceeding to a description of the protective circuitry reference is made to Figure 7 which is a rear view of one of the selector switches as, for example, the Voltage Selector switch 26a as shown in Figure 2. Said switch comprises a shaft 190 extending through aligned central holes on the various switch decks, the rear deck 191 being visible in the drawing. These switch decks are secured to the rear surface of the front panel 11 (see Figure 1) by mounting bolts 192. Secured to the bolts 192, by the nuts 193, is a mounting bracket 194 to which is secured a micro-switch 195 having a plunger 196 and a pivotally-mounted roller 197. As is well known, such micro-switches may be provided internally with a pair of normally-open contacts, or a pair of normally-closed contacts, with a movable blade cooperating with one or the other of two stationary contacts to provide a single-pole, double-throw action. The switch contacts are connected to an external circuit by means of suitable screw terminals 198. A detent wheel 199 is secured to the shaft 190 and is rotatable upon manual rotation of a control knob as, for example, the Voltage Selector control knob 26 shown in Figure 1. It is here pointed out that the detent wheel 199 is provided with a series of peripheral teeth corresponding in geometry and location to the indexing action of the switch as a whole. That is, when the control knob is rotated to the next index position, the teeth on the wheel 199 will cause a movement of the actuating roller 197 resulting in a momentary actuation of the micro-switch 195. In the case of the Voltage Selector switch, here under discussion, the micro-switch is of the normally-closed (NC) type and will momentarily open the electrical circuit each and every time the shaft 190 is rotated to another index position, either forward or reverse. Similar micro-switch arrangements are provided on the Range Selector, Output Selector, Current Selector switches. On the other hand, the micro-switches similarly associated with the Voltage Control and Current Control are of the single-pole, double-throw type. In the latter case the circuit controlled by the micro-switches is closed only when the Voltage and Current Controls are in the zero position.

Reference is now made to Figure 2 for a detailed description of the protective circuitry. It will be noted that all decks of the Voltage Selector switch 26a are shown as mechanically coupled to the NC (normally-closed) micro-switch 195, as indicated by the broken line K. Thus, any actuation of the Voltage Selector switch to a new position results in a momentary opening of the micro-switch 195. Similarly, the Range Selector switch 29a is coupled to the normally closed (NC) micro-switch 200 as indicated by the broken line L; the Output Selector switch 17a, is coupled to the normally-closed (NC) micro-switch 201 as indicated by the broken line M; the movable arm of the Current Control 32a is coupled to the single-pole, double-throw micro-switch 202 as indicated by the broken line O; the movable arm of the Voltage Control 28a is coupled to the single-pole, double-throw micro-switch 203 as indicated by the broken line P; the Current Selector switch 30a is coupled to the normally-closed (NC) micro-switch 204 indicated by the broken line T; and the MV Selector switch 25 is coupled to the normally-closed micro-switch 205 as indicated by the broken line S. Before proceeding to a description of the protective circuit, enclosed within the dotted line 51, I again wish to point out that the cams which are rotated upon rotary adjustment of the Current Control 32a and Voltage Control 28a are formed so that the respectively associated micro-switches 202 and 203 are in the illustrated, closed position only when such controls are at the zero position, that is, when the voltage output of the control is zero. For all other positions of these controls 28a and 32a the associated micro-switches are in the open circuit position.

Upon closure of the main line switch 15 the signal lamp 16a is energized and current flows through the heater winding 206 of a time delay relay 207, the lamp 16a serving to notify the operator that the apparatus is so energized. In about 30 seconds the heater winding causes a closure of the time delay relay contacts 208 thereby applying the 120 volt power to the primary winding of the transformer 210, said transformer having a full wave bridge rectifier R connected across the secondary winding. The relatively low D.-C. voltage output of the bridge is utilized to operate the power relay 48 having three sets of normally-open contacts. Thus, if the Voltage Control 28a and the Current Control 32a are in zero position, the associated micro-switches 203 and 202 are in closed circuit positions and the circuit between the bridge rectifier and the operating coil of the power relay 48 is complete, such circuit being traceable as follows: positive (+) terminal of the bridge, lead 210', closed contacts of micro-switch 203, lead 211, closed contacts of micro-switch 202, lead 212a, coil of relay 48, lead 212, normally-closed micro-switch 205, normally-closed micro-switch 204, lead 213, normally-closed micro-switch 195, lead 214, normally-closed micro-switch 200, lead 215, normally-closed micro-switch 201, and lead 216 that is connected to the negative (−) output terminal of the bridge R. Such energization of the operating coil of relay 48 results in a closure of all three sets of contacts. Since the contacts 220 are connected between one side of the relay operating coil and the positive (+) output terminal of the bridge R it will be apparent that closure of such contacts locks the relay in the closed position. The second set of relay contacts 221 are ineffective at this point since the stationary contact is connected to the now-open contact of the micro-switch 203. The third set of relay contacts 50 connect the Current and Voltage Controls to the 120 volt power line; the circuit being traceable as follows: lead 42, leads 46 and 45, Voltage Control 28a and Current Control 32a, lead 47, closed contacts 50 and lead 49. Thus, power is supplied to the apparatus through the Voltage and Current controls whenever the power relay 48 is in the closed position. It is to be noted, however, that the right hand end of the operating winding of the power relay 48 is connected to the negative (−) output terminal of the bridge R in series with the normally-closed contacts of all of the micro-switches 205, 204, 195, 200 and 201. Consequently, the momentary opening of any of these micro-switches will result in an immediate de-energization of the power relay 48 with a consequent opening of the relay contacts 50 and the removal of energizing power from the Voltage and Current Controls. Inasmuch as each of these particular micro-switches are mechanically coupled to the various selector switches, any movement of any one of the selector switches to the next index position will result in the removal of power from the Voltage Control 28a and the Current Control 32a. If such momentary opening of the power circuit takes place while the Voltage and Current Controls are set in the zero position the power relay 48 will immediately close again when the moved selector switch has been fully positioned in its next index position but in such event no damage will occur to either the apparatus or the test instrument connected thereto as the voltage output of the Voltage and Current Controls is zero.

If, however, the operator rotates any of the selector switches when either the Voltage Control or Current Control is in other than zero position (that is in a position supplying voltage to the apparatus) one or the other of the micro-switches 202 and 203 will be in the open circuit position and the power relay 48 will not close after a momentary opening of any one of the micro-switches associated with the selector switches. For example, if the Range Selector switch 29a is set to the V position and the Voltage Selector switch 26a is set to the 300 volt position the apparatus is condition to apply any adjustable voltage from 0–300 to a test instrument connected to the apparatus. If the Voltage Control 28a is set to provide a 300 volt output and the operator unwittingly seeks to change the Range Selector switch to the MV position without first rotating the Voltage Control to the zero position, the protective circuit removes all voltage from the operating components of the apparatus and the test instrument. The apparatus will remain de-energized until both the Voltage and Current Controls are returned to zero positions. Such action arises by reason of the fact that the operating coil of the power relay 48 is connected to the positive (+) output terminal of the rectifier bridge R through both micro-switches 202 and 203, in series. The signal lamp 225a (visible through a colored bulls eye lens 225 on the front panel of the apparatus as shown in Figure 1) is so connected that it is energized upon closure of the power-control contacts 50 of the power relay. Hence, such light serves to notify the operator that the apparatus is in condition for operation with power supplied to the Voltage and Current Controls. Conversely, the failure of such signal to light is a notice to the operator that he must return the Voltage and Current Controls to the zero positions.

The central contacts 221, of the power relay 48, control the operation of an auxiliary relay 226 having a pair of normally closed contacts 227. When the auxiliary relay contacts are closed the discharge resistor is connected across the output of the H. V. Rectifier 40, the circuit being traceable as follows, beginning at the positive (+) output terminal of the rectifier 40: lead 230, closed contacts 227 of auxiliary relay, lead 231, resistor 240, lead 232, common bus N and lead 64. The closure of the power relay contacts 221 conditions the circuit for the application of voltage to the operating coil of the auxiliary relay but such voltage is applied only upon movement of the Voltage Control 28a from its zero position. I have already explained with specific reference to Figure 3 the adjustment of the voltage output of the high voltage rectifier 40 by means of the Voltage Control 28a and reference back to Figure 3 will show the auxiliary relay 226 and the discharge resistor 240. Since the voltage output of the rectifier 40 is zero until the Voltage Control 28a is moved from its zero position, it is desirable to maintain the discharge resistor connected across the rectifier output until such time as voltage actually is desired from the rectifier. Referring again to the protective circuit in Figure 2, movement of the Voltage Control 28a from its zero position causes the movable blade of the micro-switch 203 to close with the left hand contact thereby energizing the auxiliary relay as follows: positive (+) terminal of the bridge R, lead 210, micro-switch 203, lead 234, closed power relay contacts 221, lead 235, operating coil of auxiliary relay 226, lead 236 and lead 216 that is connected to the negative (—) bridge terminal. Such energization of the auxiliary relay results in an opening of the contacts 227 and thereby disconnects the discharge resistor 240 from the output circuit of the H. V. Rectifier 40. It will be apparent that a return of the Voltage Control 28a to its zero position will result in an actuation of the associated micro-switch 203 to the position illustrated and a reclosure of the auxiliary relay contacts. So too, if any of the selector switches are moved while the Voltage Control is not in its zero position, the power relay 48 is de-energized and the consequent opening of the power relay contacts 221 also breaks the circuit to the operating coil of the auxiliary relay thereby connecting the discharge resistor across the rectifier 40 output circuit.

From the above description of the protective circuit it will be clear that any movement of the various selector switches will break the circuit of the power relay and disconnect the power line from the Voltage and Current Controls, and re-establishment of the power line connection will take place only when both the Voltage and Current Controls are returned to the zero positions. Further, the discharge resistor remains connected across the high voltage D.-C. output circuit until the Voltage Control is actually moved from its zero position. As a result both the apparatus and the test instrument which may be connected thereto are protected against misuse of the apparatus and the operator is protected against electrical hazards arising by virtue of the high voltage used.

Having now described my invention in detail in accordance with the requirements of the patent statutes various modifications and changes will occur to those skilled in this art. Such modifications and changes can be made without departing from the spirit and scope of the invention as set forth in the following claims.

I claim:

1. Apparatus for applying a voltage of a selected magnitude to a device under test comprising a potential transformer having a primary winding and a secondary winding provided with a plurality of taps; means energizing the said primary winding from a source of voltage through an adjustable transformer; a pair of output terminals to which the device under test may be connected, one of said output terminals being connected to the said secondary winding; a selector switch having a plurality of stationary contacts individually connected to the taps on said secondary winding and a cooperating movable contact that is connected to the other said output terminal; and protective means effective upon movement of the movable contact to disconnect the adjustable transformer from the source of voltage.

2. The invention as recited in claim 1, wherein the protective means comprises a normally-closed switch, means momentarily opening said normally-closed switch as the said movable contact moves from one to another of the stationary contacts; a power relay having an operating coil and a set of normally-open contacts that are connected between the source of voltage and the adjustable transformer and means energizing the relay operating coil through the normally-closed switch.

3. Apparatus for applying a voltage of selected magnitude to a device under test comprising a potential transformer having a primary winding and a secondary winding provided with a plurality of taps; a power relay having an operating coil and a set of normally-open contacts; an adjustable control transformer connected between a voltage source and the said primary winding through the normally-open set of relay contacts; a multi-point selector switch having a rotatable member; circuit elements connecting the selector switch and transformer secondary winding to the device under test through a pair of apparatus output terminals, a selected portion of the secondary winding being connected across the output terminals upon a selected setting of the selector switch; a first, normally-closed switch; means momentarily opening the said first switch as the selector switch is operated from one point to another; a second normally-closed switch; means opening the second switch when the adjustable control transformer is set to deliver a voltage to the said primary winding; and circuit elements connecting the operating coil of the power relay to a source of energizing voltage through the two said normally-closed switches.

4. The invention as recited in claim 3, wherein the said power relay includes a set of normally-open contacts; and circuit elements connecting one side of the relay operating coil to one side of the source of energizing voltage through the said second set of relay contacts.

5. Apparatus for applying a voltage of selected magnitude to a device under test comprising a potential transformer having a primary winding and a secondary winding provided with a plurality of fixed taps; a power relay having an operating coil, a first set of normally-open contacts and a second set of normally-open contacts; an adjustable control transformer connected between a voltage source and the said primary winding through the said first set of normally-open contacts; a pair of output terminals to which the device under test may be connected, one output terminal being connected to the said secondary winding; a rotary switch having a plurality of stationary contacts individually connected to the taps of said secondary winding and a cooperating rotatable contact connected to the other of said output terminals; a first normally-closed switch connected between one side of the power relay operating coil and one side of a second voltage source, leads connecting the second set of normally-open relay contacts between the said one side of the second voltage source and the said one side of the relay operating coil; a second normally-closed switch connected between the other side of the second voltage source and the other side of the relay operating coil; means coupling the said first normally-closed switch to the adjustable member of the adjustable control transformer in such manner that the switch is opened when the control transformer applies a voltage to the primary winding of the potential transformer; and means coupling the said second normally-closed switch to the rotatable contact of the rotary switch such that the switch contacts are opened momentarily when the rotary member is moved from one to another of the stationary contacts.

6. Apparatus for applying a D.-C. voltage of selected magnitude to a device under test comprising a voltage rectifier having an input circuit and an output circuit including a capacitor; a pair of apparatus output terminals to which the device under test can be connected; means connecting the rectifier output circuit to the said output terminals; a potential transformer having a primary winding and a secondary winding provided with a plurality of taps; a multi-point selector switch having a rotatable member; circuit elements connecting the secondary winding to the rectifier input circuit through the selector switch, a selected portion of the secondary winding being connected to the rectifier input circuit upon a selective setting of the selector switch; an adjustable control transformer connected between the said primary winding and a source of voltage; means effective upon movement of the selector switch from one point to another to open the circuit between the adjustable control transformer and the source of voltage; a discharge resistor normally connected across the said capacitor; and means disconnecting the resistor from the capacitor when the adjustable control transformer is set in a position to deliver a voltage to the said primary winding.

7. Apparatus for applying a D.-C. voltage of selected magnitude to a device under test comprising a pair of apparatus output terminals to which the device under test may be connected; a voltage rectifier having an input circuit and an output circuit including a capacitor; circuit elements connecting the rectifier output circuit to the said output terminals; a potential transformer having a primary winding and a secondary winding having a plurality of taps; a rotary selector switch having a plurality of stationary contacts individually connected to the taps of the secondary winding and a cooperating rotatable contact; circuit elements connecting the said rotatable contact and the said secondary winding to the rectifier input circuit; a power relay having an operating coil and a set of normally-open contacts; an adjustable control transformer having an output circuit connected to the said primary winding and an input circuit; circuit elements connecting the input circuit of the control transformer to a source of voltage through the said normally-open power relay contacts; a first, normally-closed switch; means momentarily opening the said first switch as the rotatable contact of the selector switch moves from one to another of the cooperating stationary contacts; a second, normally-closed switch; means retaining the second switch in open position when the adjustable control transformer is set to develop a voltage at its output circuit; a source of energizing voltage; circuit elements connecting the operating coil of the power to the source of energizing voltage through both of the said normally-closed switches; a discharge resistor; and means connecting said discharge resistor across the said capacitor when the operating coil of the power relay is de-energized.

8. The invention as recited in claim 7, wherein the means connecting the discharge resistor across the said capacitor comprises a second set of normally-open contacts on the power relay, an auxiliary relay having a set of normally-closed contacts and an operating coil, leads connecting the discharge resistor across the capacitor through the normally-closed contacts of the auxiliary relay, and circuit elements connecting the operating coil of the auxiliary relay to the said source of energizing voltage through the said second set of normally-open power relay contacts.

9. The invention as recited in claim 8, including a third set of normally-open contacts on the power relay, and circuit elements connecting one side of the power relay operating coil to one side of the source of energizing voltage through the said third set of normally-open contacts.

10. In apparatus of the type comprising a potential transformer energizable from an external source of voltage, control means for adjusting the magnitude of the voltage applied to the transformer primary winding, and means including a multi-position selector switch for applying to a set of output terminals the voltages developed by a tapped secondary winding of the transformer; an improved safety arrangement comprising means momentarily disconnecting the control means from source of voltage as the said selector switch is moved from one position to another, and means retaining the control means so disconnected until the said control means is adjusted to reduce to substantially zero the magnitude of the voltage applied to the transformer primary winding.

11. The invention as recited in claim 10, wherein the safety arrangement comprises a power relay having an operating coil and a set of normally-open contacts connected serially between the control means and the source of voltage, a first normally-closed switch momentarily operable to open position as the said selector switch is moved from one to another position, a second normally-open switch, means including the adjustable member of the control means to close the said second switch closed only when the control means is adjusted to reduce to substantially zero the magnitude of the voltage applied to the transformer primary winding, and circuit elements connecting the operating coil of the relay to an energizing source of potential through both said first and second switches.

12. In calibrating apparatus of the class adapted to be energized by a source of alternating current energy to provide selected magnitudes of A.-C. and D.-C. voltages and currents to a test device connected to the apparatus output terminals, the combination of a multi-contact rotary output selector switch manually settable to condition the apparatus circuitry for delivering either A.-C. or D.-C. voltages and currents to the test device; a multi-point rotary range-selector switch manually settable to condition the circuitry of the apparatus for the current or voltage to the test device; a multi-point rotary voltage selector switch manually settable to condition the apparatus circuitry a selected range of current and voltage magnitudes to the test device, an adjustable voltage control and adjustable current control, each such control having a movable member settable to a zero voltage output position; a power relay having an operating coil and two sets of normally-open contacts; leads connecting the said voltage and current controls to the source of alternating current energy through a first set of power relay contacts; a first normally-closed switch actuated momentarily to open position as the output selector switch is set from one to another of the associated contacts; a second normally-closed switch actuated momentarily to open position as the range-selector switch is set from one to another of the associated contacts; a third normally-closed switch actuated momentarily to open position as the voltage selector switch is set from one to another of the associated contacts; a source of energizing voltage; leads connecting the said three normally-closed switches in series between one side of the power relay operating coil and one side of said energizing voltage; a first normally-open switch actuated to closed position when the adjustable member of the voltage control is set to the zero voltage output position; a second normally-open switch actuated to closed position when the adjustable member of the current control is set to the zero voltage output position; leads connecting the said two normally-open switches in series between the other side of the power relay operating coil and the other side of the said energizing voltage; and leads connecting the second set of said relay contacts between the said other side of the power relay operating coil and the said other side of the energizing voltage.

13. The invention as recited in claim 12, including a third set of normally-open contacts on the power relay; an auxiliary relay having a set of normally-closed contacts; leads connecting the energizing coil of the auxiliary relay to the said energizing voltage upon closure of the said third set of power relay contacts; a voltage rectifier having an output circuit connectable to the test device, said output circuit including a capacitor; and a discharge resistor connected across said capacitor through the set of normally-closed contacts of the auxiliary relay.

No references cited.